(12) United States Patent
Baron

(10) Patent No.: US 6,482,451 B1
(45) Date of Patent: Nov. 19, 2002

(54) APPARATUS FOR PRODUCING A FLAVORED BEVERAGE

(76) Inventor: Peter Baron, 46 John Street, Woollahra, NSW 2025 (AU)

(*) Notice: Subject to any disclaimer, the term of this patent is extended or adjusted under 35 U.S.C. 154(b) by 0 days.

(21) Appl. No.: 09/284,264
(22) PCT Filed: Oct. 10, 1997
(86) PCT No.: PCT/AU97/00680
§ 371 (c)(1), (2), (4) Date: Jun. 7, 1999
(87) PCT Pub. No.: WO98/15187
PCT Pub. Date: Apr. 16, 1998

(30) Foreign Application Priority Data

Oct. 10, 1996 (AU) .............................. PO 2907
Jun. 4, 1997 (AU) .............................. PO 7164

(51) Int. Cl.[7] .............................. A23L 2/00; A47G 21/18; A61J 15/00
(52) U.S. Cl. .............................. 426/85; 426/115; 239/33; 604/85; 424/400
(58) Field of Search .............................. 426/85, 115, 134; 239/33; 604/83, 84, 85; 424/400

(56) References Cited

U.S. PATENT DOCUMENTS

| 1,000,332 A | * 8/1911 | Dyer |
| 1,254,115 A | * 1/1918 | Brand |
| 1,333,011 A | * 3/1920 | Crady |
| 1,996,203 A | * 4/1935 | Hollingsworth |
| 2,102,920 A | * 12/1937 | Savage |
| 2,128,448 A | * 8/1938 | Lamoine Wright |
| 2,812,257 A | * 11/1957 | Scijorek |
| 2,867,361 A | * 1/1959 | Mead et al. |
| 3,438,527 A | * 4/1969 | Gamblirl |
| 3,610,483 A | * 10/1971 | Visconti et al. |
| 3,615,595 A | 10/1971 | Guttag |
| 3,620,770 A | 11/1971 | Harvey |
| 3,717,476 A | 2/1973 | Harvey |
| 3,824,322 A | * 7/1974 | Fiorella |
| 4,298,475 A | * 11/1981 | Gartner |
| 4,792,330 A | * 12/1988 | Kidder |
| 4,921,713 A | * 5/1990 | Fowler |
| 4,981,468 A | * 1/1991 | Benefiel et al. |
| 4,995,976 A | * 2/1991 | Vermes |
| 5,045,195 A | * 9/1991 | Spangrud et al. |
| 5,052,614 A | * 10/1991 | Xuan |
| 5,094,861 A | * 3/1992 | D'Auguste et al. |
| 5,156,335 A | * 10/1992 | Smith et al. |
| 5,156,737 A | * 10/1992 | Iand et al. |

(List continued on next page.)

FOREIGN PATENT DOCUMENTS

| DE | 3731058 | 4/1989 |
| FR | 1176877 | 4/1959 |
| GB | 2168027 | 6/1996 |
| WO | 9703634 | 2/1997 |

OTHER PUBLICATIONS

Derwent WPAT Online Abstract Accession No. 97–022538, DE 29616646m U1 (KIS E) Dec. 5, 1996.

Food and Science Technology Abstracts, Accession No. 83–12e0773, BE 884962m 1980.

*Primary Examiner*—Steve Weinstein
(74) *Attorney, Agent, or Firm*—Rothwell, Figg, Ernst & Manbeck

(57) ABSTRACT

A flavoring receptacle contains a predetermined portion of flavoring agent for sale and use in conjunction with a compatible pre-packaged unflavored beverage of appropriate relative volume. The flavoring receptacle is generally elongate and tubular in shape and contains end caps. The flavoring receptacle is thereby adapted for use as a straw. Passage of the unflavored beverage through the flavoring receptacle provides for mixing with the flavoring agent to produce a flavored beverage.

18 Claims, 2 Drawing Sheets

U.S. PATENT DOCUMENTS 5,201,460 A * 4/1993 Caines
5,509,605 A * 4/1996 Cripe
5,601,207 A * 2/1997 Paczonay
5,718,681 A * 2/1998 Manning
5,780,058 A * 7/1998 Wong et al.
5,910,321 A * 6/1999 Wong et al.
5,921,955 A * 7/1999 Mazer et al.
5,985,324 A * 11/1999 Wong et al.
5,989,590 A * 11/1999 Wong et al.
6,024,721 A * 2/2000 Wong et al.

* cited by examiner

APPARATUS FOR PRODUCING A FLAVORED BEVERAGE

FIELD OF THE INVENTION

The present invention relates generally to the flavouring of prepackaged or bottled beverages.

BACKGROUND OF THE INVENTION

The invention has been developed primarily for use in relation to flavoured milk packaged in cartons for immediate consumption at the point of sale, and will be described with reference to this application. It will be appreciated, however, that the invention is not limited to this particular use.

It is well known that unflavoured or plain milk is sold at a variety of retail outlets in small sized "TETRA-PACK" type cartons intended for immediate consumption. Flavoured milk is sold in the same way. Due to pricing constraints applied in Australia and elsewhere, the profit for retailers of plain milk sold in this form is relatively marginal. The same pricing constraints do not apply to flavoured milk and so these products are typically priced substantially higher, often by a factor of three or more. However, the wholesale price of flavoured milk is also substantially more than that of plain milk, making the flavoured product in this form relatively expensive for both the retailer and the consumer. A more cost effective flavouring process would enhance profit margins for the retailers and reduce the price to consumers.

A further problem with prepackaged beverages, and in particular with milk products sold in TETRA-PACK cartons, is that of hygiene. When the carton is opened, the lip is necessarily contacted by the hands of the user, which may not have been recently cleaned. Moreover, the carton will normally have been handled many tomes previously during packing, transportation and stacking on shelves. If the consumer then drinks directly from the lip, a hygiene problem is immediately apparent.

In an attempt to address this problem, straws are often used. However, this is not always successful. Retailers periodically run out of stock and are unable to supply the straws. In any case, the straws themselves are often handled or stored in unhygienic conditions. A further problem is that because the retailer is not normally able to charge an additional price for straws, their supply effectively further reduces the profit margin. Consequently, there is no incentive for the retailer to supply a straw with each carton, and the consumer will often not think to ask.

In order to address the particular hygiene problem associated with the handling of straws, the technique of providing individually pre-wrapped straws is also known. However, these are even more expensive and consequentially, there is even less incentive for retailers to stock and diligently provide them to customers. Accordingly, they have not found widespread acceptance. Many of the factors outlined above apply not only to milk, but to many other beverages such as mineral waters, cordials, carbonated beverages, colas and the like.

A further problem relates to stock and inventory control. Most ranges of milk, carbonated mineral waters, cordials, and other beverages are produced in a variety of different flavours. Consequently, a considerable amount of valuable fridge space is required in retails outlets in order to provide adequate stocks of the full range.

It is an object of the present invention to overcome or substantially ameliorate at least some of these disadvantages of the prior art.

DISCLOSURE OF THE INVENTION

Accordingly, the invention provides a flavouring receptacle including a generally elongate tubular body, a predetermined measure of flavouring agent in granular form, filtration means disposed at or adjacent each end of the tubular body to retain the granular flavouring agent substantially within the body, the receptacle being adapted for use as a drinking straw in combination with a compatible unflavoured beverage, whereby the flavouring agent is progressively added to the beverage upon passing through the straw.

Preferably, the tubular body contains a predetermined portion of the flavouring agent in suitable concentration for sale and use in conjunction with a compatible pre-packaged unflavoured beverage of appropriate relative volume, thereby permitting a consumer to select and mix the flavouring agent and the unflavoured beverage at a point of sale for immediate consumption.

Advantageously, this arrangement allows the consumer to control the intensity of flavouring delivered to the beverage, according to the rate at which the liquid is sucked through, and hence the "dwell time" within, the straw. This also obviates the need for the consumer to dispense the flavouring agent into the beverage as a separate manual process step.

In the preferred embodiment, the retaining means include a perforated cap retained at each end of the straw. The perforations are preferably configured to be sufficiently small to retain the flavouring granules within the straw, and sufficiently large to allow relatively unimpeded passage of liquid through the straw. Each end cap preferably takes the form of an inwardly extending conical formation, to provide an increased surface area for the perforations, and hence a greater cross-sectional flow area for the liquid to pass through into the straw.

Preferably, the internal region of the straw is not filled entirely with flavouring granules, so that a free space is left to facilitate mixing of the flavouring with the plain beverage.

In this embodiment, the height of the flavouring receptacle is preferably greater than the height of the beverage container to avoid inadvertent loss of the straw within the container.

In one embodiment, the receptacle is hygienically sealed in an outer wrapper adapted for removal by the consumer immediately prior to use. The flavouring is preferably in the form of small spheres, crystals or tablets.

The beverage is preferably plain milk, prepackaged in a "TETRA-PACK" type carton.

BRIEF DESCRIPTION OF THE DRAWINGS

A preferred embodiment of the invention will now be described, by way of example only, with reference to the accompanying drawings in which.

PREFERRED EMBODIMENT OF THE INVENTION

Figure 1:
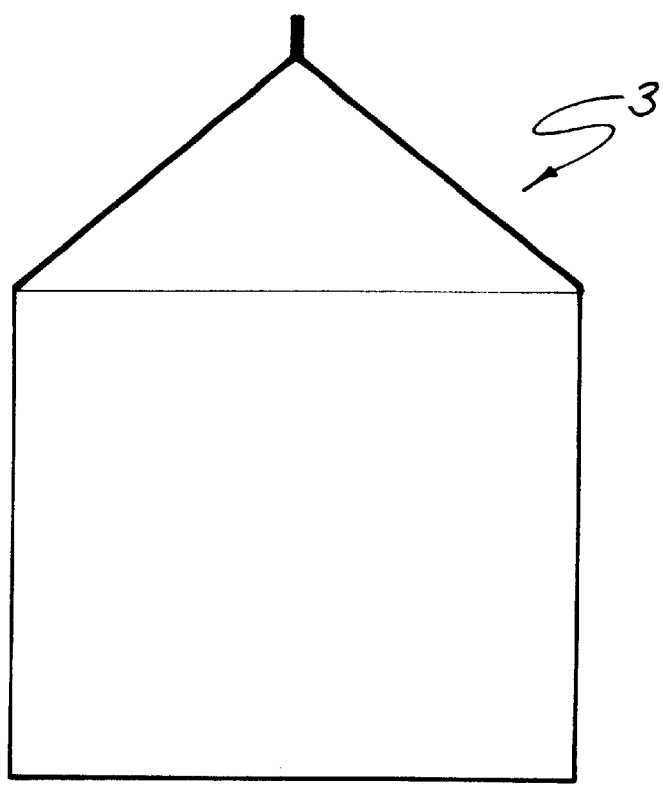
FIG. 1 is a side view showing a standard TETRA-PACK type plain milk carton.

Referring to the drawings, the invention provides a flavouring receptacle 1 adapted to contain a predetermined measure of relatively concentrated flavouring agent 10 for use with a relatively unflavoured plain beverage. In this case, the plain beverage is milk, prepacked in a TETRA-PACK type carton 3.

Figure 2:
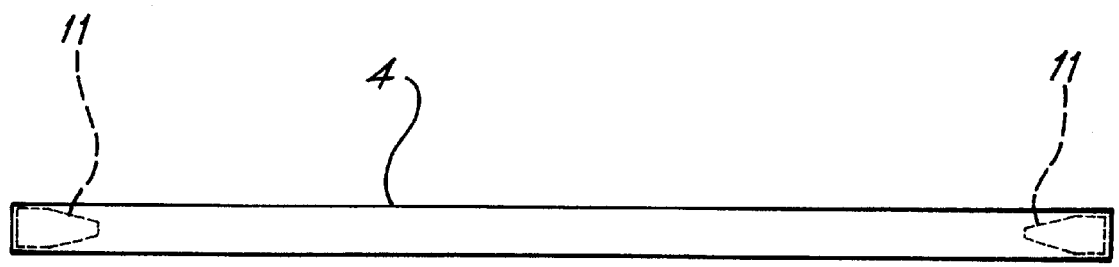
FIG. 2 is a side view showing a flavouring receptacle in the form of a straw, for use with the plain milk carton of FIG. 1, according to the invention.

As best seen in FIG. 2, the flavouring receptacle 1 takes the form of an elongate tubular body 4. The tube is initially packaged within a surrounding hygienically sealed disposable wrapper (not shown). The interior volume of the tube is adapted to contain a predetermined measure of the flavouring concentrate, appropriate for the volume of beverage with which the flavouring receptacle is intended to be sold. The overall shape and proportions of the tube enable its use as a straw. In cases where larger volumes of flavouring are required, the tube may be formed with an elliptical cross-sectional profile so that subsequent use as a straw is still feasible.

In use, it is envisaged that the consumer would purchase a carton of unflavoured beverage such as milk together with a desired flavouring initially contained with the tubular receptacle or "flavour straw".

Figure 3:
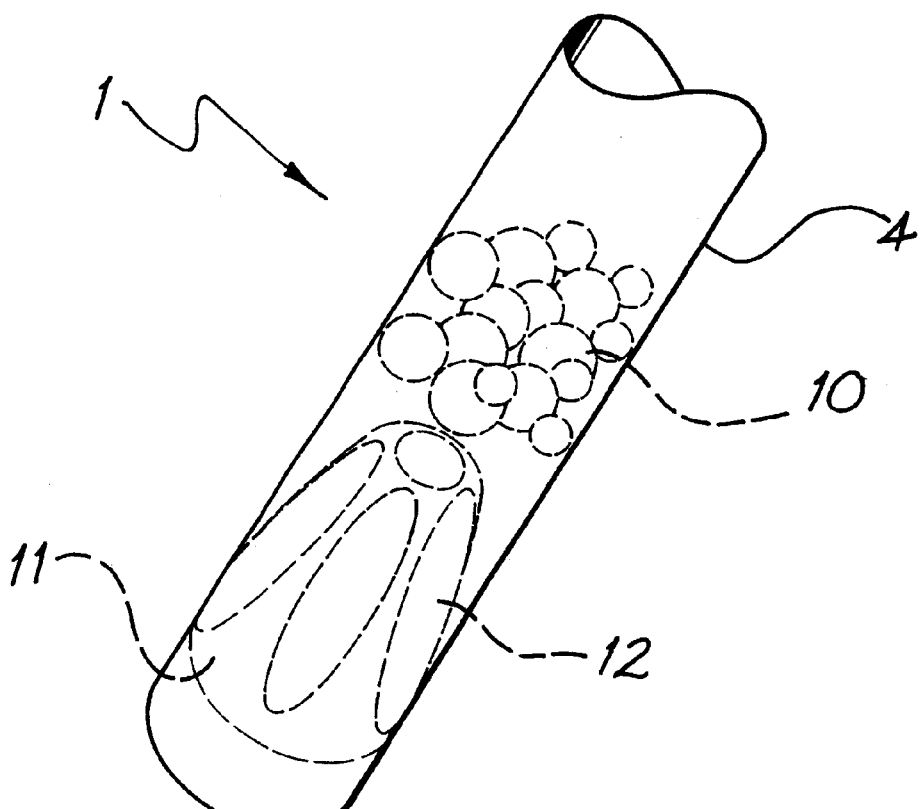
FIG. 3 is an enlarged perspective view showing one end of the flavour straw of FIG. 2, including a detail of the perforated end cap.
Figure 4:
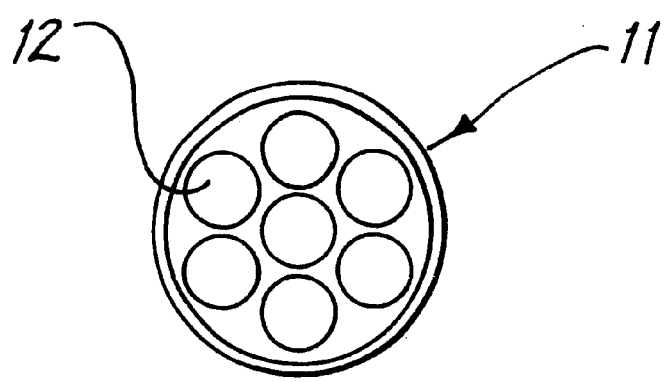
FIG. 4 is a plan view of the end cap of FIG. 3.

As shown in FIGS. 2 to 4, the flavouring agent takes the form of a plurality of solid granules 10. The granules are retained within the straw by filtration means in the form of end caps 11. The end caps incorporate perforations 12 which are sufficiently small to contain the flavouring granules and sufficiently large to allow relatively unimpeded passage of liquid through the straw. Each end cap further includes a cylindrical portion extending longitudinally with respect to the axis of the tubular body and engaging the bore of the tubular body. The end caps may be retained in place by an interference fit, circumferential ridges, a suitable adhesive, heat shrinkage, plastic welding including ultrasonic welding, or any combination of these or other methods.

As best seen in FIG. 3, the end caps are generally conical in shape to provide a larger surface area relative to flat end caps of comparable diameter. The larger surface area allows a larger number and/or size of perforations, so as to increase the effective cross sectional flow area for the liquid to pass through. This increase in surface area will be apparent from FIG. 4, which is a plan view of the conical end caps, but also shows the substantially elongate perforations projected onto a plane perpendicular to the straw as circular apertures of significantly smaller size. The end caps may also include additional filtration elements, layers or materials as required.

The flavouring receptacle or straw is preferably produced from a wax coated paper. It will be appreciated, however, that extruded plastics or any other suitable materials may be used. Moreover, although the invention has been developed primarily for use in relation to flavoured milk, it is obviously applicable to other forms of flavoured drinks such as mineral waters, sodas, milkshakes, cordials, alcoholic beverages, and the like. It may also be applied to hot beverages such as tea, coffee, hot chocolate, etc. Other possible additives include vitamin supplements, oral pharmaceuticals, and the like.

In another variation, the flavouring receptacle may contain additional filtration elements, such as small activated carbon filter cartridges particularly for use with beverages which may have not been packaged under sterile conditions. This form of the invention may also be used, for example, to produced a flavoured and purified beverage directly from domestic tap water, for example. This variation is particularly applicable to hikers, campers or where a domestic water supply contains impurities.

Advantageously, the invention provides the user with a degree of control over the intensity of the flavouring, according to the rate at which the beverage is sucked through, and hence the dwell time of the liquid within, the straw. The invention also has the advantage that the consumer is not required to open the flavouring receptacle and manually dispense the contents into the main beverage, as a separate preparation step prior to consumption. The arrangement is thus considerably less time consuming and more convenient. It has also been found that the use of flavouring granules prevents clogging of the filtration elements. It has also been found that by only partially filling the straw with flavouring granules, the resultant free space provides for enhanced agitation of the granules and hence improved mixing. This in turn results in a more uniform distribution of flavouring within the beverage, the agitated granules perform a stirring function.

Additionally, because the primary forms of the invention contemplate the supply of a flavour straw together with a prepackaged beverage to the consumer, many of the hygiene problems previously associated with this form of packaging are avoided. Furthermore, by permitting the sale of a relatively inexpensive unflavoured beverage together with an effective flavouring agent integrated with a straw, it is envisaged that retailers will be able to achieve substantially enhanced profit margins over the current form of sale of both flavoured and unflavoured beverages, and particularly milk. Further, the consumer can be provided with a greater variety of flavour selection, optionally involving the combination of a number of different flavours, and the possibility of applying the flavouring at any desired concentration. Also, because the flavouring component of the beverage will normally have a longer shelf life, particularly in the case of milk, if any unused product needs to be discarded, wastage of the flavouring component at least can be avoided. Also, because the retailer can stock a relatively large number of plain beverages in the valuable fridge space, with the flavouring receptacles stored elsewhere, stock and inventory control is greatly simplified. In all these respects, the invention represents a commercially significant improvement over the prior art.

Although the invention has been described with reference to specific examples, it will be appreciated by those skilled in the art that the invention may be embodied in many other forms.

What is claimed is:

1. A flavouring receptacle intended to be used as a straw including an elongate tubular body, a predetermined measure of flavouring agent in granular form contained within said elongate tubular body, and a pair of end caps disposed at and in opposite ends of the elongate tubular body, the caps including perforations dimensioned to be sufficiently small to retain the granules within the elongate tubular body and sufficiently large to allow relatively unimpeded passage of liquid therethrough, the end caps being generally conical in shape so as to provide an increase in surface area for the perforations relative to flat end caps of corresponding comparable diameter so as to increase the effective cross-sectional flow area for liquid to pass through, reach end cap further including a cylindrical portion extending longitudinally with respect to the axis of the tubular body and engaging the bore of the tubular body, the receptacle being adapted for use as a drinking straw in conjunction with a compatible unflavoured beverage, whereby the flavouring agent is progressively added to the beverage upon passing over the granules, through the straw.

2. A flavouring receptacle according to claim 1, wherein the tubular body contains a predetermined portion of the flavouring agent adapted for sale and use in conjunction with a compatible pre-packaged unflavoured beverage in a container of appropriate relative volume, thereby permitting a consumer to select and mix the flavouring agent and the unflavoured beverage at a point of sale for immediate consumption.

3. A flavouring receptacle according to claim 1, wherein the intensity of flavouring delivered to the beverage can be controlled by the consumer according to the rate at which the liquid is drawn through, and hence the dwell time within, the straw.

4. A flavouring receptacle according to claim 1, wherein said end caps are retained in the ends of the straw by means selected from the group consisting of an interference fit, peripheral locating ribs, heat shrinkage, thermal plastic welding and ultrasonic welding.

5. A flavouring receptacle according to claim 4, wherein said end caps are retained in the ends of the straw by means of peripheral locating ribs.

6. A flavouring receptacle according to claim 4, wherein said end caps are retained in the ends of the straw by means of heat shrinkage.

7. A flavouring receptacle according to claim 4, wherein said end caps are retained in the ends of the straw by means of thermal plastic welding.

8. A flavouring receptacle according to claim 4, wherein said end caps are retained in the ends of the straw by means of ultrasonic welding.

9. A flavouring receptacle according to claim 4, wherein said retention means is an interference fit.

10. A flavouring receptacle according to claim 1, wherein an internal region of the straw is not filled entirely with flavouring, whereby a residual free space facilitates agitation of the granules and thereby enhances mixing of the flavouring with the plain beverage passing through the straw.

11. A flavouring receptacle according to claim 1, wherein the flavouring agent is selected from the group consisting of chocolate, strawberry, vanilla, malt, banana, caramel, and coffee flavouring, and is adapted for use in conjunction with unflavoured milk.

12. A flavouring receptacle according to claim 1, wherein the flavouring agent includes a vitamin supplement.

13. A flavouring receptacle according to claim 1, wherein the flavouring agent includes a pharmaceutical adapted for oral administration.

14. A flavouring receptacle according to claim 1, wherein the tubular body is formed substantially from a wax coated paper.

15. A flavouring receptacle according to claim 1, wherein the tubular body is formed substantially from a plastics material.

16. A flavouring receptacle according to claim 1, wherein the height of the tubular receptacle is greater than the height of the beverage container, thereby to avoid inadvertent loss of the straw within the container.

17. A flavouring receptacle according to claim 1, being hygienically sealed in an outer wrapper adapted for removal by a consumer immediately prior to use.

18. A flavouring receptacle according to claim 1, the conical portion of at least one of the end caps extends inwardly along a longitudinal axis toward an interior region of the straw.

* * * * *